United States Patent
de Rooij et al.

(10) Patent No.: US 6,956,188 B2
(45) Date of Patent: Oct. 18, 2005

(54) INDUCTION HEATING COIL WITH INTEGRATED RESONANT CAPACITOR AND METHOD OF FABRICATION THEREOF, AND INDUCTION HEATING SYSTEM EMPLOYING THE SAME

(75) Inventors: Michael Andrew de Rooij, Clifton Park, NY (US); John Stanley Glaser, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 113 days.

(21) Appl. No.: 10/313,414

(22) Filed: Dec. 6, 2002

(65) Prior Publication Data

US 2004/0108311 A1 Jun. 10, 2004

(51) Int. Cl.$^7$ .......................... H05B 6/14; H01F 29/00
(52) U.S. Cl. ........................... 219/619; 336/69
(58) Field of Search ................. 219/619, 620, 219/621, 623, 624, 625, 626, 627; 336/69, 70

(56) References Cited

U.S. PATENT DOCUMENTS

| | | | |
|---|---|---|---|
| 3,814,888 A | 6/1974 | Bowers et al. | 219/10.49 |
| 4,241,250 A | 12/1980 | Steigerwald | 219/10.49 |
| 4,464,553 A | 8/1984 | Ikeda | 219/10.49 |
| 4,549,056 A | 10/1985 | Okatsuka et al. | 219/10.77 |
| 4,595,814 A * | 6/1986 | Ogino et al. | 219/664 |

(Continued)

FOREIGN PATENT DOCUMENTS

| | | | |
|---|---|---|---|
| CA | 954950 | 9/1974 | 327/19 |
| CA | 1167934 | 5/1984 | H05B/6/12 |
| WO | WO 02/081048 A1 | 10/2002 | B01D/17/06 |

OTHER PUBLICATIONS

U.S. patent application by Cornec et al., "Induction Heating Device For Heating Cooking Vessels", Pub. No. US 2001/0025848 A1, Oct. 4, 2001.

M.C. Smit, et al., "Application of Transmission Linr Principles to High Frequency Power Converters", Power Electronics Specialists Conference, 1992, PESC '92 Record, 23rd Annual IEEE, 1992 vol. 2, pp. 1423–1430.

M.C. Smit et al.,"Technology for Manufacture of Integrated Planar LC Structures for Power Electronic Applications Power Electronics and Applications, 1993, Fifth European Conference, 1993, vol. 2, pp. 173–178.

I.W. Hofsajeret al., Ingetrated Technology and Performance for Multi–kilowatt Power Electonic Converters—An Evaluation Indsutrial Electronics, Control, and Instrumentation, 1993. Proceedings of the IECON '93, International Conference 1993, vol. 2 pp. 779–784.

J.T. Strydom et al., "Packaging of an Integrated Planar Power Passive Module for a Power Electronics Converter: A 1MHz Case Study", Components and Packaging Technologies, IEEE TRansactions on Components and Packaging Technologies, vol. 25, No. 2, Jun. 2002, pp. 260–265.

L. Zhao et al., "An Alternative Planar Multi–cell Structure Integrated Reactive Module", Industry Applications Conference, 2001, Thirty–Sixth IAS Annual Meeting, Conference Record of the 2001 IEEE, vol. 4, pp. 2217–2223.

*Primary Examiner*—Daniel Robinson
(74) *Attorney, Agent, or Firm*—Kevin P. Radigan, Esq.; Heslin Rothenberg Farley & Mesiti, P.C.

(57) ABSTRACT

An induction heating coil with integrated resonant capacitor is provided, along with methods of fabrication thereof, and induction heating systems employing the same. The induction heating coil includes a cable having a first conductor and a second conductor separated by a dielectric. The resonant capacitor is defined by at least a portion of the cable's first conductor and second conductor with the dielectric disposed therebetween.

12 Claims, 5 Drawing Sheets

U.S. PATENT DOCUMENTS

| | | | |
|---|---|---|---|
| 4,749,836 A | | 6/1988 | Matsuo et al. ............ 219/10.77 |
| 4,810,847 A | | 3/1989 | Ito ......................... 219/10.77 |
| 4,820,891 A | | 4/1989 | Tanaka et al. ............ 219/10.77 |
| 5,324,906 A | * | 6/1994 | Dong ......................... 219/626 |
| 5,430,273 A | | 7/1995 | Bogdanski et al. ......... 219/624 |
| 5,450,305 A | * | 9/1995 | Boys et al. .................... 363/24 |
| 5,658,482 A | | 8/1997 | Gaspard ..................... 219/622 |
| 5,686,006 A | | 11/1997 | Gaspard ..................... 219/622 |
| 5,808,280 A | | 9/1998 | Gaspard ..................... 219/624 |
| 5,829,125 A | * | 11/1998 | Fujimoto et al. ............. 29/840 |
| 6,029,438 A | * | 2/2000 | Hosick ......................... 60/202 |
| 6,072,163 A | * | 6/2000 | Armstrong et al. ......... 219/497 |
| 6,075,427 A | * | 6/2000 | Tai et al. ..................... 333/219 |
| 6,144,019 A | | 11/2000 | Garcia et al. ............... 219/624 |
| 6,687,284 B1 | * | 2/2004 | Beauregard et al. ........ 373/102 |

\* cited by examiner

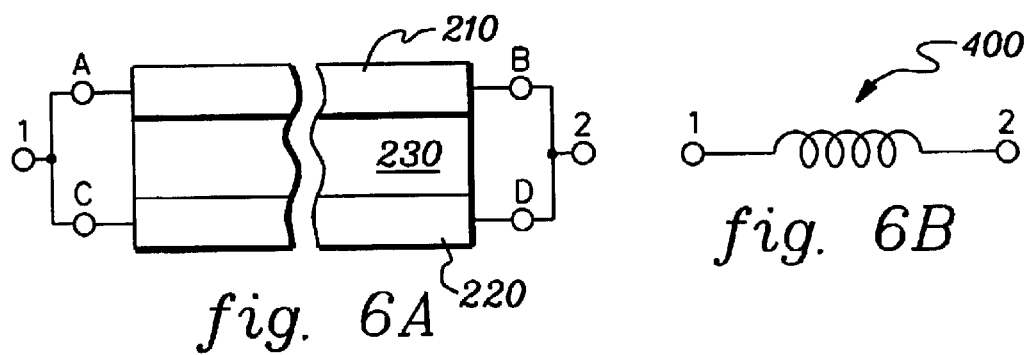
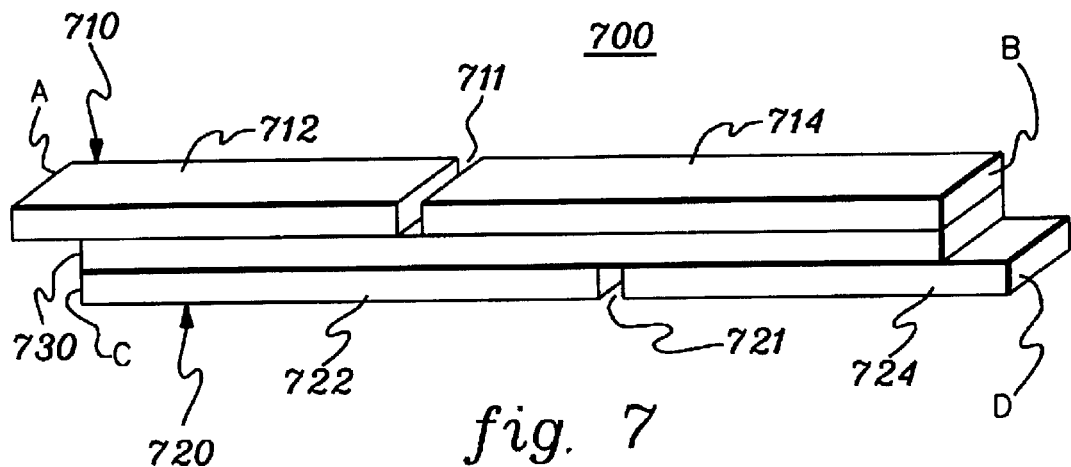
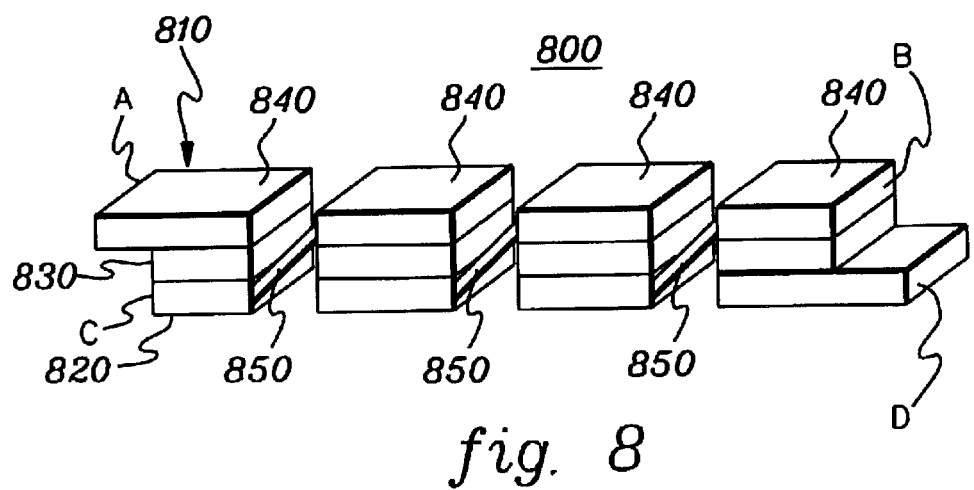

INDUCTION HEATING COIL WITH INTEGRATED RESONANT CAPACITOR AND METHOD OF FABRICATION THEREOF, AND INDUCTION HEATING SYSTEM EMPLOYING THE SAME

BACKGROUND OF THE INVENTION

The present invention relates generally to induction heating, and more particularly, to a coil with an integrated resonant capacitor for induction heating, as well as to methods of fabrication thereof and to induction heating systems employing the same.

Induction heating is a known method of heating an electrically conductive load using an alternating magnetic field to induce currents in the load. Induction heating can be beneficial in applications where direct contact with a load is undesired or unattainable, and is efficient since the majority of heating energy appears directly within the load. Further, it is possible to precisely control the depth that the heating energy penetrates into the load.

In a majority of induction heating applications, an alternating current (AC) magnetic field is generated in the load by means of a coil, known as the working coil, heating coil, or induction coil which is placed in close proximity to the load, and may even surround the load. In electrical terms, the working coil forms the primary of a transformer and the load becomes the secondary. However, the transformer thus formed often has a very high leakage inductance, and thus, a resonant circuit is usually formed by the addition of a series or parallel capacitor. This resonant capacitor has three main functions. First, the capacitor is used to cancel high leakage inductance and thus make it easier to drive the required power into the transformer, and therefore the load. Second, the combination of the load, working coil and capacitor forms a tuned network that allows simple control of the load power by adjustment of the input frequency. Third, the tuned network formed acts to reduce the harmonic content of the magnetic field, minimizing the electromagnetic interference (EMI) generated.

The resonant capacitor for an induction heater must often store a great deal of reactive power, meaning that the capacitor must handle high voltage, high current, or both. This typically requires an expensive and physically large capacitor. Furthermore, capacitor losses must be taken into account to prevent overheating and capacitor failure.

There are several approaches used for resonant capacitors. For industrial applications, custom capacitors are often placed in metal cans filled with dielectric fluid. A benefit of this approach is simplification of the thermal management. In other applications, custom capacitors can be constructed using many smaller capacitors in order to handle the defined requirements. In all these cases, however, the capacitor(s) is(are) a separate physical entity, which necessarily increases the overall size of the induction heater. Thus, recognized herein is a need in the art for an enhanced coil for induction heating which is designed with an embedded capacitance that reduces the overall cost and size of the resultant induction heating apparatus.

SUMMARY OF THE INVENTION

The present invention provides, in one aspect, a coil for induction heating, which includes a cable having an integrated resonant capacitor. The cable includes a first conductor and a second conductor, with a dielectric disposed between the conductors. The resonant capacitor includes at least a portion of the first conductor and the second conductor with the dielectric disposed therebetween.

In another aspect, an induction heating system is presented which includes at least one induction coil for generating a time-varying magnetic field to heat a load. The at least one induction coil includes at least one integrated resonant capacitor cable segment having a first conductor and a second conductor separated by a dielectric. The resonant capacitor is defined by at least a portion of the first conductor, the second conductor and the dielectric disposed between the conductors.

In a further aspect, a method of fabricating a coil for induction heating is presented. This method includes: providing a cable, the providing including providing a dielectric and providing a first conductor disposed above a first surface of the dielectric and a second conductor disposed above a second surface of the dielectric, wherein the first conductor and the second conductor are separated by the dielectric and define an integrated resonant capacitor, with the resonant capacitor comprising at least a portion of the first conductor, the second conductor and the dielectric disposed therebetween; and winding the cable into the coil by making at least one turn thereof.

BRIEF DESCRIPTION OF THE DRAWINGS

The present invention may take form in various components and arrangements of components, and in various steps and arrangement of steps. The drawings presented herewith are for purposes of illustrating certain embodiments and should not be construed as limiting the invention. The subject matter which is regarded as the invention is particularly pointed out and distinctly claimed in the claims at the conclusion of the specification.

FIG. 6A depicts an elevational view of a cable to be wound into a coil for induction heating, with integrated resonant inductance and resonant capacitance, and showing still another example of terminal connections thereto;

FIG. 6B is an equivalent electrical schematic for the circuit connections of FIG. 6A;

FIG. 7 is a perspective view of an alternate embodiment of a cable to be wound into a coil for induction heating, wherein a transverse slit is present in both the first conductor and second conductor of the cable for reducing cable capacitance, in accordance with an aspect of the present invention;

FIG. 8 is a perspective view of still another embodiment of a cable to be wound into a coil for induction heating wherein the induction cable is segmented, e.g., for reduced cable capacitance, and the lower conductors are electrically connected to the upper conductors of adjacent segments, in accordance with another aspect of the present invention;

DETAILED DESCRIPTION OF THE INVENTION

Although described herein with reference to an induction cooking system, such as an induction cooktop, the induction coil and methods of fabrication thereof are applicable to a variety of induction heating applications. The claims presented herewith are intended to encompass all such induction heating applications.

Figure 1:
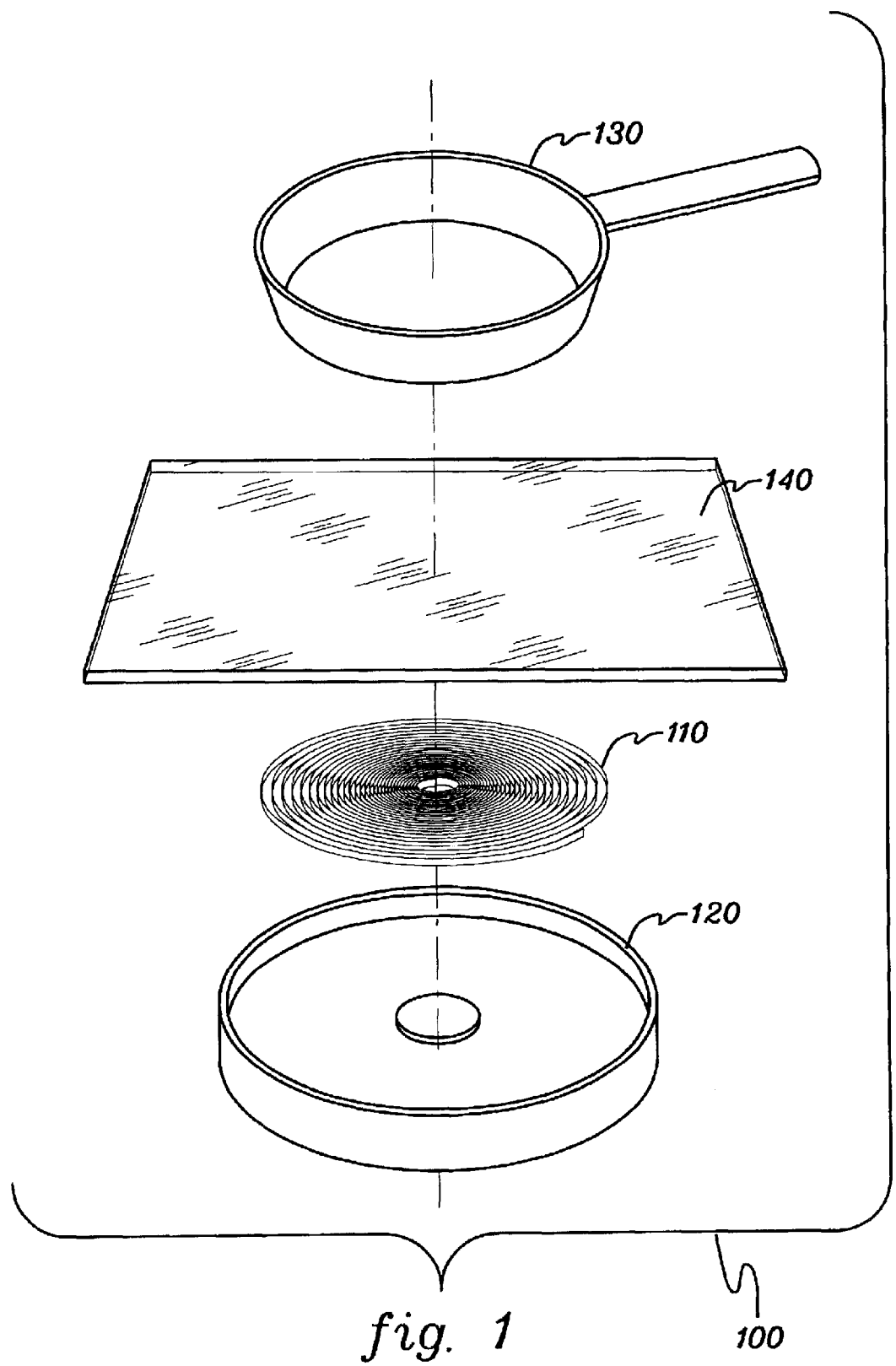
FIG. 1 is an exploded perspective view of one embodiment of selected components of an induction heating system, and conductive load placed thereon, to employ an induction coil, in accordance with an aspect of the present invention.

FIG. 1 depicts an exploded, partial embodiment of an induction cooking system, generally denoted 100, to employ a working coil 110 for induction heating. An optional ferromagnetic core 120 for working coil 110 is disposed adjacent to one side of the coil, and may be spaced from the coil by a predetermined air gap. In this example, core 120 has a radius approximately equal to that of working coil 110. The ferromagnetic core serves as a high permeability path for the magnetic flux return after passing through a metallic vessel 130.

Working coil 110 is disposed below a non-metallic support 140, typically constructed of a thin sheet of ceramic glass or plastic. Support 140 is commonly referred to as the cooking surface, which supports the metallic cooking vessel or pan 130. Vessel 130, which could comprise any available metallic utensil or container used in food preparation, is made of a magnetic material such as (for example) magnetic stainless steel or cast iron, a non-magnetic material such as aluminum, or a laminate product as for instance copper on stainless steel. Special cooking utensils are not required, although results are optimized by appropriately selecting the size, shape and material of the cooking utensil. Efficiency of the induction cooking system can be improved by impedance matching the utensil and the inverter. Usually, high resistance magnetic materials provide a better source-to-load match.

In one embodiment, a power conversion circuit (not shown) is provided suitable for energization of the induction cooking system from a single phase commercially available 60 Hertz, 120 Volt or 240 Volt source of alternating current power. However, equipment can be designed for use with higher or lower frequency and/or voltage sources or even a DC source in appropriate cases. Numerous implementations of a power conversion circuit for generating an ultrasonic or supersonic frequency wave for driving working coil 110 are available in the art. The power conversion circuit, in one embodiment, might include a rectifier and a solid state inverter for converting a unidirectional rectifier output to an ultrasonic frequency wave for driving the working coil 110. Through operation of the power conversion circuit, an ultrasonic frequency wave is impressed on working coil 110 which results in the generation of a varying or alternating magnetic field. The alternating magnetic field produced above working coil 110 is coupled directly to vessel 130. An alternating magnetic field is also produced below working coil 110, and a portion of this magnetic flux is coupled to vessel 130 by means of the shortened magnetic return paths provided by core 120. An ultrasonic frequency above approximately 18 kilohertz is normally considered to be the upper range of human hearing and is therefore selected to make the cooking appliance inaudible to most people.

As noted initially herein, the working coil can often have a very high effective inductance due to the leakage inductance. To address this, a resonant circuit is typically formed by the addition of a series or parallel capacitor or a combination of both series and parallel capacitors. These capacitors are typically separate, discrete elements of the induction cooking system and are electrically connected in a resonant circuit with the working or induction coil as desired for a particular application. The resonant capacitor for an induction heater must often store a great deal of reactive power, meaning that the capacitor must handle high voltage, high current, or both. This results in an expensive and physically large capacitor. Also, as noted above, capacitor losses need to be taken into account to prevent overheating and capacitor failure. To address these issues, provided herein is a novel induction coil construction for use with induction heating systems.

A simple capacitor is made up of two conducting plates separated by a dielectric material. The distance of the separation, the effective area of the two plates and the dielectric constant of the dielectric material all influence the value of the capacitance that can be obtained from the structure. In accordance with an aspect of the present invention, a resonant capacitor is embedded within the induction coil itself, thereby reducing the size of and/or eliminating the need for an external, discrete capacitor structure.

Figure 2:
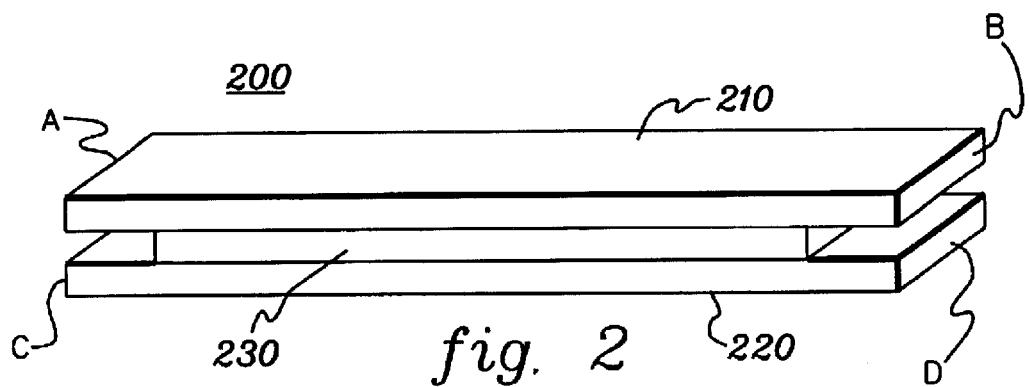
FIG. 2 is a perspective view of one embodiment of a cable to be wound into a coil for induction heating, in accordance with an aspect of the present invention.
Figure 3:
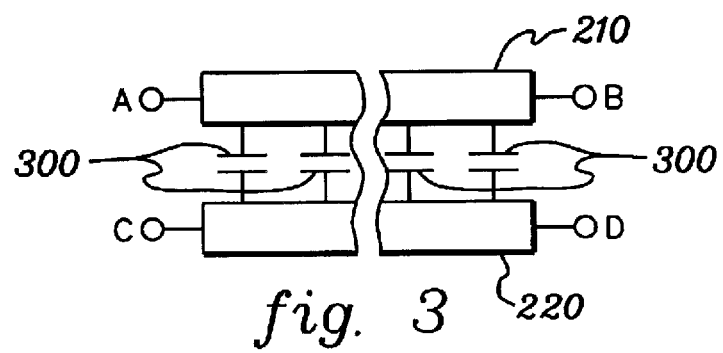
FIG. 3 is an equivalent electrical circuit representation for the integrated resonant circuit of the cable of FIG. 2.

FIG. 2 depicts one implementation of an embedded capacitor cable, generally denoted 200. Cable 200 includes a dielectric substrate 230, such as a polyimide (e.g., mylar or kapton), with conductors 210 & 220 disposed above the main surfaces of the substrate. As one example, conductors 210 & 220 comprise copper or aluminum conductors. Conductors 210 & 220 adhere to dielectric substrate 230 via, for example, adhesive or bonding by means such as sputtering of the conductors onto the substrate or by thermal bonding. FIG. 3 depicts an equivalent circuit model for the embedded capacitor cable depicted in FIG. 2. Conductors 210 & 220 comprise distributed inductors with first terminal ends A, C and second terminal ends B, D, respectively. A capacitance 300 is distributed along the length of the cable. The simplified equivalent circuit of FIG. 3 for the embedded capacitor cable is for frequencies where the wavelength of the signal is substantially greater than the length of the cable. Although this is not a requirement for an implementation of an embedded capacitor cable, it will facilitate optimization of performance by simplifying analysis and minimizing presence of standing waves on the cable.

Figure 4A:
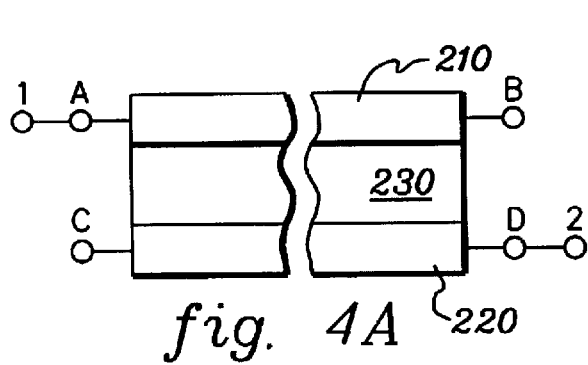
FIG. 4A is an elevational view of one embodiment of a cable to be wound into a coil for induction heating, with integrated resonant inductance and resonant capacitance, and showing an example of terminal connections thereto, in accordance with an aspect of the present invention.
Figure 4B:
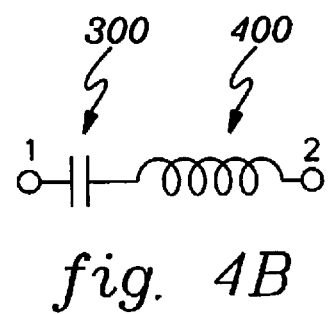
FIG. 4B is an equivalent electrical schematic for the circuit connections of FIG. 4A.
Figure 5A:
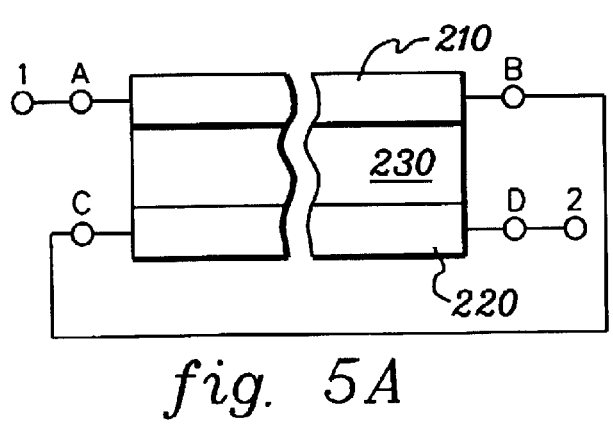
FIG. 5A depicts an elevational view of a cable to be wound into a coil for induction heating, with integrated resonant inductance and resonant capacitance, and showing an alternate example of terminal connections thereto, in accordance with an aspect of the present invention.
Figure 5B:
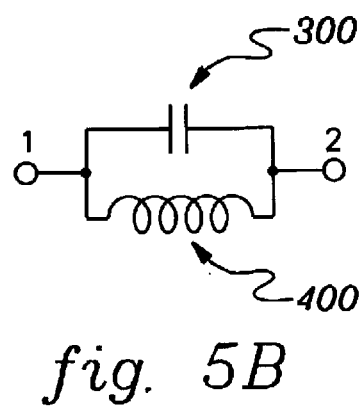
FIG. 5B depicts an equivalent electrical schematic for the circuit connections of FIG. 5A.

FIGS. 4A & 4B depict configuration connections to the embedded capacitor cable which result in a series connected capacitance 300 and inductance 400. As shown, a first connection 1 is made to a first end A of conductor 210 and a second connection 2 is made to a second end D of second conductor 220. FIGS. 5A & 5B depict a connection configuration where capacitance 300 and inductance 400 are disposed in parallel. This is achieved by electrically shorting together the second end B of conductor 210 and the first end C of conductor 220. Shorting terminal ends B & C together can be accomplished during winding of the cable into a coil. FIGS. 6A & 6B depict a connection configuration wherein only inductance 400 is present in the cable. This configuration is achieved by electrically shorting together first end A of conductor 210 and first end C of conductor 220, as well as by shorting together second end B of conductor 210 and second end D of conductor 220.

Those skilled in the art should note that an induction coil can employ a combination of series and parallel connected capacitances and inductances, as well as conventional cable segments to achieve a desired resonant circuit. This can be readily accomplished by, for example, providing different cable segments or sections implementing various combinations of the different circuit configurations of FIGS. 4A-6B.

FIGS. 7 & 8 depict different embodiments 700, 800, respectively, for reducing or programming a series capacitance in the cable should the total distributed capacitance of the coil be too large. These modifications to the cable break up the cable capacitance into a number of series capacitances, thereby resulting in a lower total coil capacitance. By proper adjustment of the length and number of segments, any desired capacitance below the maximum capacitance of the unsegmented cable can be obtained. If greater capacitance is required, an insulating layer with a higher dielectric constant could be employed. This ability to "program" the capacitance of the cable facilitates optimization of the resultant working coil at a desired operating frequency.

In FIG. 7, a transverse slit 711 is disposed in conductor 710 of the cable, meaning that conductor 710 is divided into segments 712 & 714. Similarly, a transverse slit 721 in conductor 720 is provided dividing conductor 720 into segments 722 & 724. The effect of transverse slits 711 & 721 is to divide the ribbon cable into a series of smaller capacitances, with the inductance value of the cable being only negligibly affected. Obviously, the number and positioning of the transverse slits within the coil can be selected to program a particular desired capacitance for the resonant circuit.

In FIG. 8, the cable is split into multiple segments 840, with each segment comprising a portion of the first conductor 810, the second conductor 820 and the dielectric 830 disposed therebetween. Cross connections 850 are made to electrically connect the conductor 820 of one segment to conductor 810 of an adjacent segment, resulting in multiple series connected capacitors, with the overall capacitance of the coil being reduced, and selectively programmed as needed for a particular application.

Figure 9:
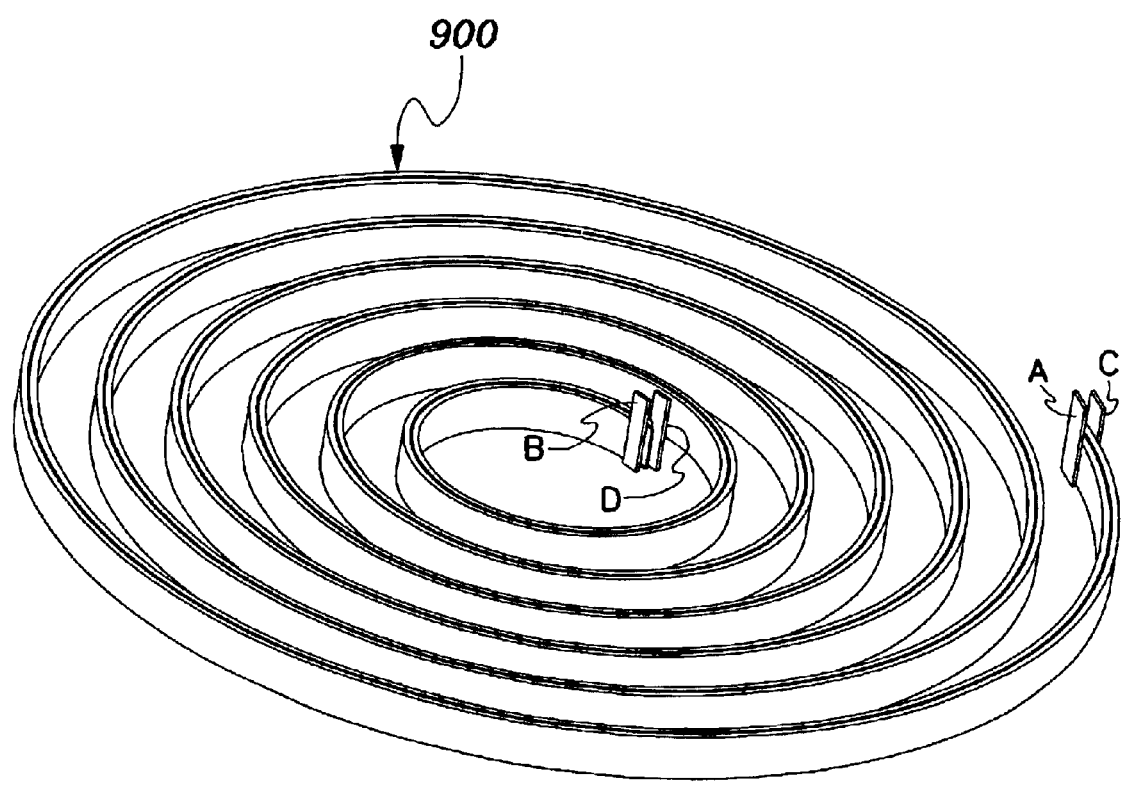
FIG. 9 is a perspective view of one embodiment of a vertical-type, spiral wound cable defining an induction coil, in accordance with an aspect of the present invention.
Figure 10:
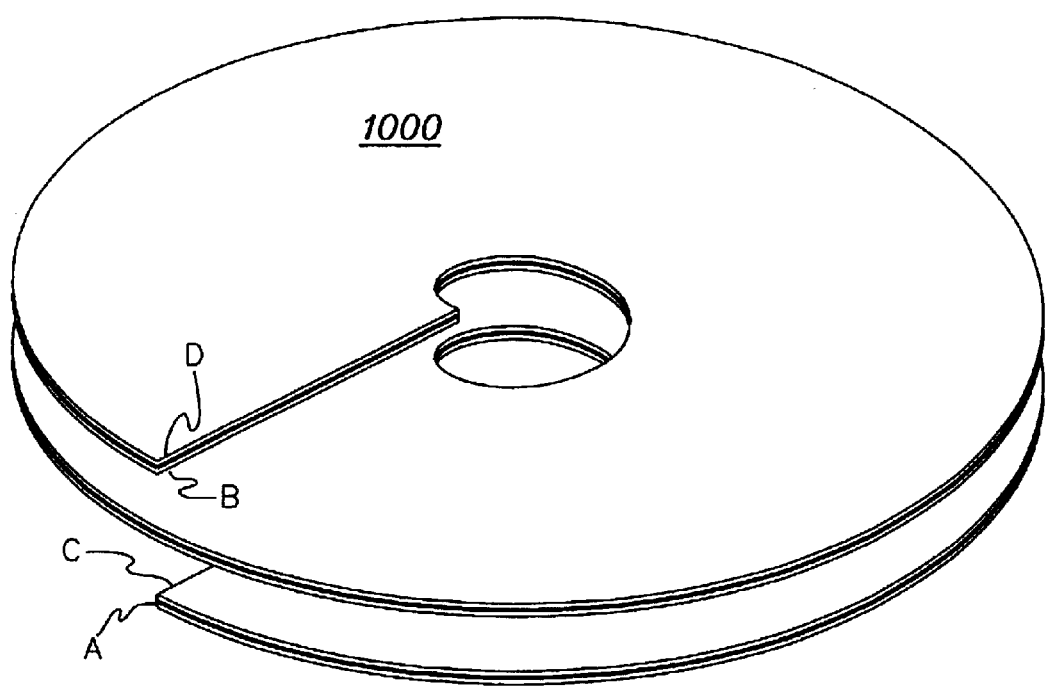
FIG. 10 is a perspective view of one embodiment of a horizontal-type, spiral wound cable defining an induction coil, in accordance with an aspect of the present invention.

At least two winding variations are possible, i.e., vertical and horizontal. A vertical coil winding approach results from the cable being wound as a tape, while a horizontal coil winding approach results from the cable being wound in a corkscrew manner. The coil configuration and choice of winding technique is based on the field orientation of the application that will produce the least losses in the coil. FIG. 9 depicts an embedded capacitor ribbon coil 900 used in a vertical fashion and wound in a tape-like spiral manner. FIG. 10 shows an embedded capacitor coil 1000 formed and used in a horizontal fashion, and wound in a corkscrew spiral manner. Note that a working coil implementation can employ a combination of both vertical and horizontal windings in different interconnected segments.

The dimensions of the coil and the conductors are based on the intended frequency range of operation and the current amplitude for the application where the coil is to be used. The conductors and the dielectric may have different thicknesses if desired for a particular application. The choice of dielectric can be, but is not limited to, a polyimide. This material is well known in the electronics industry.

Once a working coil is constructed using an embedded capacitor cable as disclosed herein, the coil can be used for induction heating purposes. The shapes shown in FIGS. 9 & 10 are well suited for an induction cooktop, where a large flat plate forms the load (i.e., the plate being the bottom of a cooking vessel in this case), as shown in FIG. 1. It is also possible to have the load be placed in or pass through the center of the coil. In this case, the coil might have a different aspect ratio than shown, but the principle remains the same. Many other implementations of embedding the capacitor into the cable are also possible. For example, the cable could be implemented within a coaxial cable, or embedded within a stranded cable.

As noted above, a single induction coil can be constructed in sections so that different sections of the coil employ any of the cable configurations described above, or none of them (i.e., one or more sections could be a conventional coil), with all sections contributing to the magnetic flux that transfers energy from the coil to the load. This allows significant versatility in the construction and use of the induction coil.

The segments of a multi-segment working coil can be readily reconfigured by connecting the terminals to change the capacitance from, for example, in series or parallel with the inductance, or removed from the resonant circuit, as desired. This allows one coil to handle different loads. Further, the coil can still be used in conjunction with external inductors and capacitors as desired. Although the discussion above presents a physically wound cable, this is not a necessity. An induction coil with an integrated capacitor as presented herein could be constructed by many of the techniques used to construct magnetic components, such as deposition of conductor patterns on a substrate or the use of photolithographic techniques commonly used to make printed circuit boards.

The integrated resonant capacitor coil disclosed herein possesses numerous advantages over prior induction coil implementations. For example, an embedded capacitance coil is a lower cost solution than a discrete component resonant circuit implementation. Further, improved reliability is obtained due to the reduction in the number of contact points required for the dielectric components, and overall reduction in the number of physical components, while imposing minimum change in performance and operation of the integrated components compared with discrete components. An embedded capacitance coil is more compact than a resonant circuit implemented with discrete components, with a reduced amount of materials being needed for the integrated capacitance example compared with the discrete component example. The embedded capacitor coil can be implemented using existing technology with minimal changes. Construction methods are disclosed to integrate the capacitor into a magnetic structure such as an inductor. Further, the capacitor voltage stress is reduced since the capacitance and voltage is distributed across the length of the embedded capacitor coil. These and other advantages of the structures disclosed herein should be apparent to those skilled in the art.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A device comprising:

an induction heating coil, the coil comprising:
- a cable having an integrated resonant capacitor and comprising a first conductor and a second conductor separated by a dielectric; and
- wherein the resonant capacitor comprises at least a portion of the first conductor and the second conductor with the dielectric disposed therebetween.

2. The device of claim 1, wherein the coil is a working coil of an induction heater, and wherein the resonant capacitor comprises an embedded capacitor within the working coil.

3. The device of claim 2, wherein the working coil comprises a wound cable, the wound cable comprising at least one of a vertical wound cable portion and a horizontal wound cable portion.

4. The device of claim 1, wherein the first conductor comprises a first end and a second end, and the second conductor comprises a first end and a second end, with the first end of the first conductor being adjacent to the first end of the second conductor, and the second end of the first conductor being adjacent to the second end of the second conductor, and wherein the resonant capacitor is integrated in at least one of series or parallel with a resonant inductor of the coil.

5. The device of claim 4, wherein the resonant capacitor is series connected to the resonant inductor by a first connection to the first end of one of the first conductor and the second conductor, and a second connection to the second end of the other of the first conductor and the second conductor.

6. The device of claim 4, wherein the resonant capacitor is parallel connected to the resonant inductor by a first connection to the first end of one of the first conductor and the second conductor, and a second connection to the second end of the other of the first conductor and the second conductor, and wherein the second end of the one conductor is electrically tied to the first end of the other conductor.

7. A coil comprising:

a cable having an integrated resonant capacitor and comprising a first conductor and a second conductor separated by a dielectric;

wherein the resonant capacitor comprises at least a portion of the first conductor and the second conductor with the dielectric disposed therebetween; and wherein at least one of the first conductor and the second conductor has at least one transverse slit therein to reduce a capacitance value of the coil's resonant capacitor.

8. The device of claim 1, wherein the coil is divided into multiple induction cable segments, with each segment of at least some segments comprising the integrated resonant capacitor, and wherein the second conductor of at least one segment is electrically connected to the first conductor of another segment of the at least some segments to program a capacitance value of the coil's resonant capacitor.

9. A coil comprising:

a cable having an integrated resonant capacitor and comprising a first conductor and a second conductor separated by a dielectric;

wherein the resonant capacitor comprises at least a portion of the first conductor and the second conductor with the dielectric disposed therebetween; and wherein the integrated resonant capacitor comprises a first segment of the coil, and wherein the coil includes at least one additional segment, with the first segment and the second segment being electrically coupled.

10. The device of claim 1, wherein capacitance of the resonant capacitor is distributed along a length of the cable.

11. The device of claim 1, wherein the dielectric comprises a dielectric substrate, and wherein the first conductor and the second conductor are adhered to the dielectric substrate.

12. The device of claim 11, wherein the dielectric substrate comprises polyimide, and the first conductor and the second conductor comprise copper.

* * * * *